United States Patent [19]

Jones

[11] Patent Number: 4,731,544
[45] Date of Patent: Mar. 15, 1988

[54] METHOD AND APPARATUS FOR EXTRACTING SURF AND WAVE ENERGY

[76] Inventor: Dedger Jones, 885 Freeway Dr. North, Columbus, Ohio 43229

[21] Appl. No.: 867,052

[22] Filed: May 27, 1986

[51] Int. Cl.⁴ .......................... F03B 13/00; E02B 9/08
[52] U.S. Cl. ....................................... 290/53; 290/42; 415/5; 415/7; 417/330
[58] Field of Search ....................... 290/53, 42, 54, 43; 415/5, 7; 417/330, 331, 333; 60/398, 497, 498, 500, 504, 505

[56] References Cited

U.S. PATENT DOCUMENTS

| | | | |
|---|---|---|---|
| 1,473,103 | 11/1923 | Johnson et al. | 415/5 |
| 1,847,855 | 3/1932 | Young | 415/5 |
| 2,758,814 | 8/1956 | Kratz | 415/5 |
| 3,882,320 | 5/1975 | Schmeller | 415/5 X |
| 3,927,330 | 12/1975 | Skorupinski | 415/5 X |
| 3,989,951 | 11/1976 | Lesster et al. | 290/53 |
| 4,301,377 | 11/1981 | Rydz | 415/7 X |
| 4,350,474 | 9/1982 | Murphy | 415/5 X |
| 4,404,490 | 9/1983 | Taylor et al. | 290/53 X |

FOREIGN PATENT DOCUMENTS 2384130 11/1978 France ........................ 415/5

Primary Examiner—William M. Shoop, Jr.
Assistant Examiner—Sharon D. Logan
Attorney, Agent, or Firm—John L. Shailer

[57] ABSTRACT

An apparatus and method for using same for extracting energy from waves, including near-shore waves by imparting momentum to an energy roller or energy car. The energy roller or car is moved along a flexible floating belt by the action of waves on the shape of the flexible floating belt. The invention also provides for a hydrodynamically shaped float to be driven along a rigid floating structure by the action of a wave at the rear of the float.

11 Claims, 9 Drawing Figures

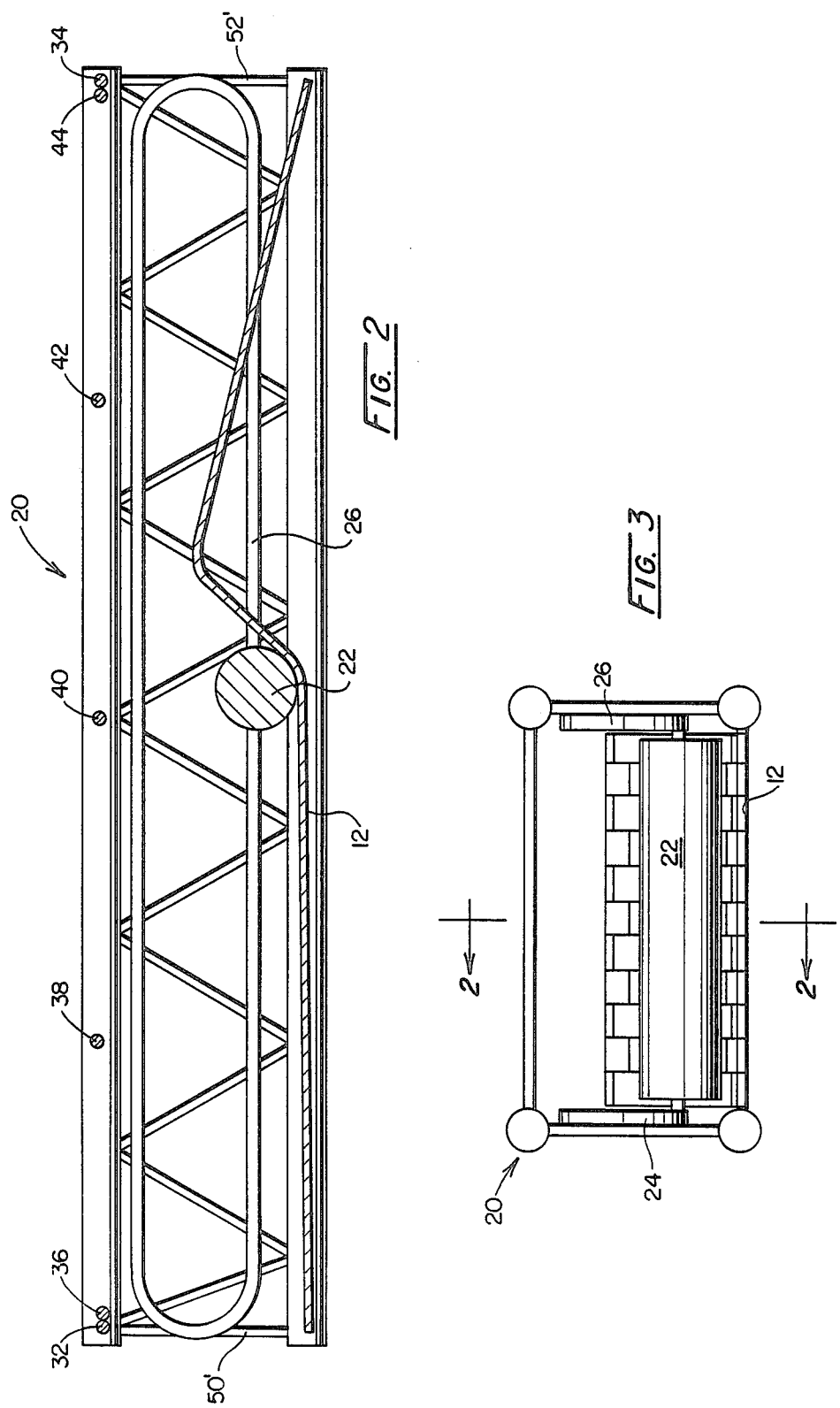

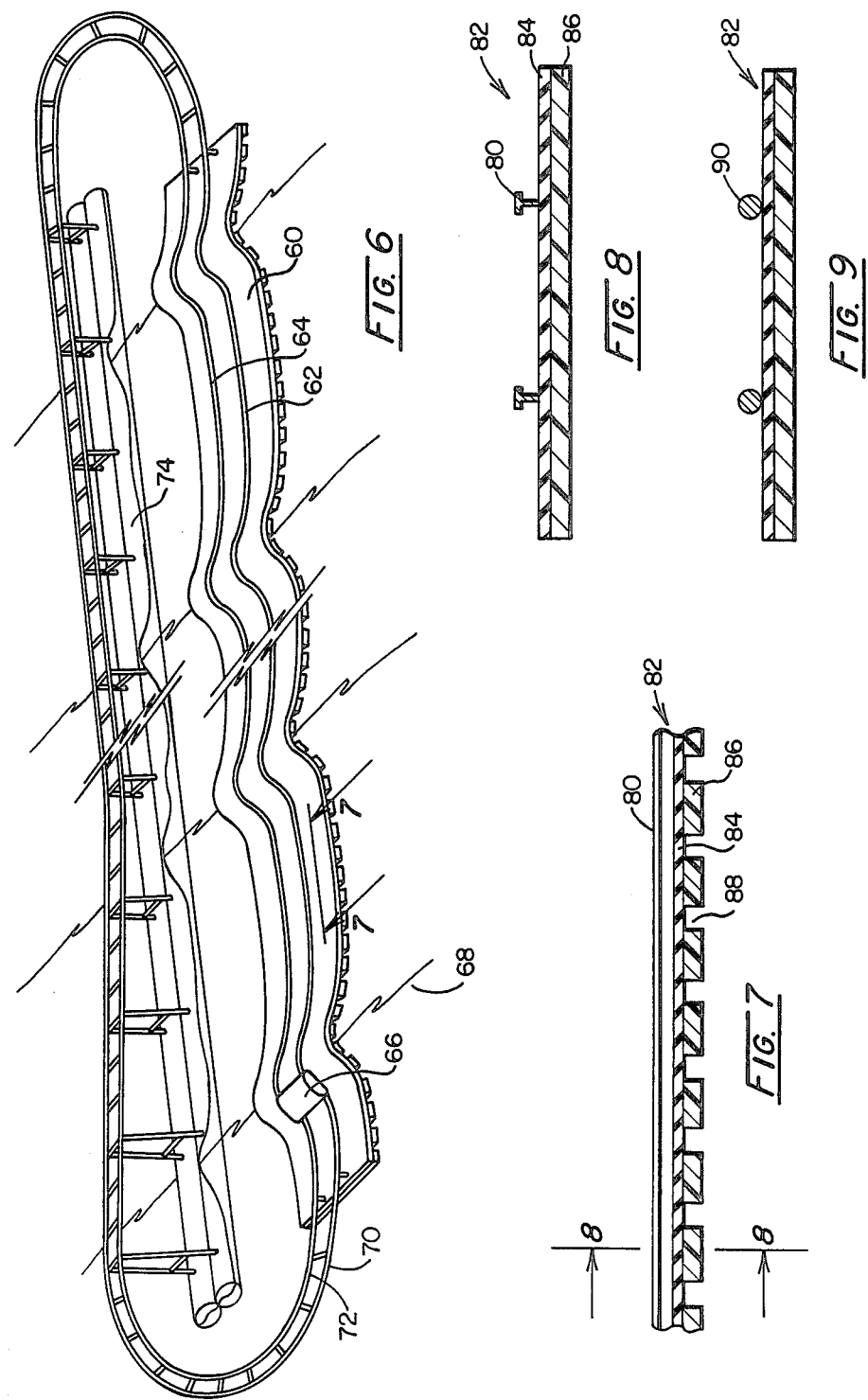

METHOD AND APPARATUS FOR EXTRACTING SURF AND WAVE ENERGY

FIELD OF THE INVENTION

The invention relates to a method for extracting energy from surf and waves and an apparatus for carrying out the method. More particularly, the present invention relates to a method of extracting useable and reliable amounts of energy from near shore surf and from waves generated in large bodies of water.

BACKGROUND OF THE INVENTION

In recent years, numerous attempts have been made to extract the vast quantities of energy that are contained in the oceans' waves. Studies by Gerstner in the early 1800's described in general terms the very large amounts of energy available, and postulated the mechanisms by which such waves were formed. Attention has heretofore focused on deep ocean waves having significant wave height; i.e., greater than 4 feet (1.25 m.). The most common devices have utilized wave following apparatus in which a piston or float is moved relative to a cylinder or other floats respectively. The relative motion is merely caused by the rise and fall of the wave. Such devices have also required waves which exhibit relatively constant characteristics of uniform wave height and generally constant direction of motion of the wave front. Additionally, for proper exploitation, such waves required a relatively constant period of motion. Period of motion is also referred to as frequency, which is determined by the length of time that it takes the crest or highest point of the wave to pass a fixed point in space and continuing until the next wave crest is encountered. The second wave crest is encountered only after a low point, called the trough, has passed the same fixed point. The height of the wave is considered to be the vertical distance between the water surface in the trough and the water surface at the crest. Significant improvements have been made over the simple wave follower type of device. Amplification and multiplication of the energy recoverable from waves is disclosed in the U.S. Pat. Nos. 4,355,511 and 4,563,591 to Jones.

Although the above methods and devices are suitable for extracting wave energy near shore, they are most effective when the waves encountered are of a substantially constant wave-form, as described above. Most proposed methods of wave energy extraction have avoided the problems of surf where the available wave height is much less and the waves do not exhibit a constant waveform. The velocity of a wave slows as it approaches the shore, the speed going to zero at the shore line. A wave, which exhibits hydraulic effects below the trough, is affected by the bottom near shore. Energy is dissipated against the bottom by friction and in the "breaking" of the wave. However, significant energy remains available until the velocity does go to zero. Additionally, such energy, once extracted is available closer to the locations it is needed than is energy extracted deep ocean waves.

Therefore, there is need for a method and apparatus for implementing and practicing such method for extracting in useable and reliable amounts the energy available in near-shore waves and surf.

SUMMARY OF THE INVENTION

A primary aspect of the present invention resides in the provision of a flexible floating belt which conforms to the water surface, wave crests and troughs, upon which it floats.

Another aspect of the present invention resides the provision of an energy roller which is disposed upon the flexible floating belt. The energy roller is "pushed" along the upper surface of the belt toward shore by the action of the waves. The roller tends to seek, by gravity, the lowest point of the belt, where the belt conforms to a wave trough. Since the trough moves toward shore, the roller does too. Therefore, the roller gains kinetic energy as it is moved.

A further aspect of the present invention resides in the provision of an apparatus and method for extracting energy from surf waves having a variable speed.

Another aspect of the present invention resides in the provision of an apparatus and method for extracting energy from surf waves of variable wave height.

An additional aspect of the present invention resides in the provision of an apparatus and method for extracting energy from surf waves having a variable direction.

A further aspect of the present invention resides in the provision of a floating rigid structure for retaining the flexible floating belt. The structure does not affect the ability of the belt to conform to the water surface.

Another aspect of the present invention resides in the provision of a method for protecting the shore from erosion by surf waves.

An additional aspect of the present invention lies in the provision of a track for the guiding of the energy roller to a place of beginning away from shore.

A further aspect of the present invention resides in the provision of closed cell floating rigid materials as part of the flexible floating belt.

A further aspect of the present invention resides in the provision of an energy car which rides on flexible floating belt. The car is "pushed" along the rails located on the belt toward the shore by the action of the waves. The car tends to seek, by gravity, the lowest point of the belt, where the belt conforms to a wave trough. The trough moves toward the shore at either a constant or a variable speed, depending upon the wave, and thereby the cart moves at the same speed.

Another aspect of the present invention resides in the provision of a return track upon which the energy car is returned to a place of beginning away from the shore.

A further aspect of the present invention resides in the provision of a hydrodynamically shaped energy float. The float is vertically retained by a floating rigid structure, but is free to move horizontally. The float is driven by a wave crest in the direction of wave motion. Momentum is thereby imparted to the float.

Another aspect of the present invention resides in the provision of a means for converting the momentum or kinetic energy of the hydrodynamically shaped energy float into electrical energy.

An additional aspect of the present invention resides in the provision of a means for converting the linear momentum of the energy roller into a useable form of energy.

A further aspect of the present invention resides in the provision of a means for converting the angular momentum of the energy roller into a useable form of energy.

BRIEF DESCRIPTION OF THE DRAWINGS

The best mode contemplated in carrying out this invention is illustrated and better understood by reference to the following detailed description when considered in conjunction with the accompanying drawings in which:

FIG. 2 is a side elevation sectional view taken along line 2—2 of FIG. 3;

FIG. 3 is an end elevation view of the apparatus of FIG. 1;

FIG. 6 is a perspective view of a further alternative embodiment of an apparatus according to the present invention;

FIG. 7 is a side elevation sectional view of a flexible floating belt according to the present invention taken along line 7—7 of FIG. 6;

FIG. 8 is an elevation sectional view of a flexible floating belt with track according to the present invention taken along line 8—8 of FIG. 7;

FIG. 9 is an elevation sectional view of an alternative embodiment of a flexible floating belt with track according to the present invention.

DETAILED DESCRIPTION OF THE PREFERRED EMBODIMENT

Figure 1:
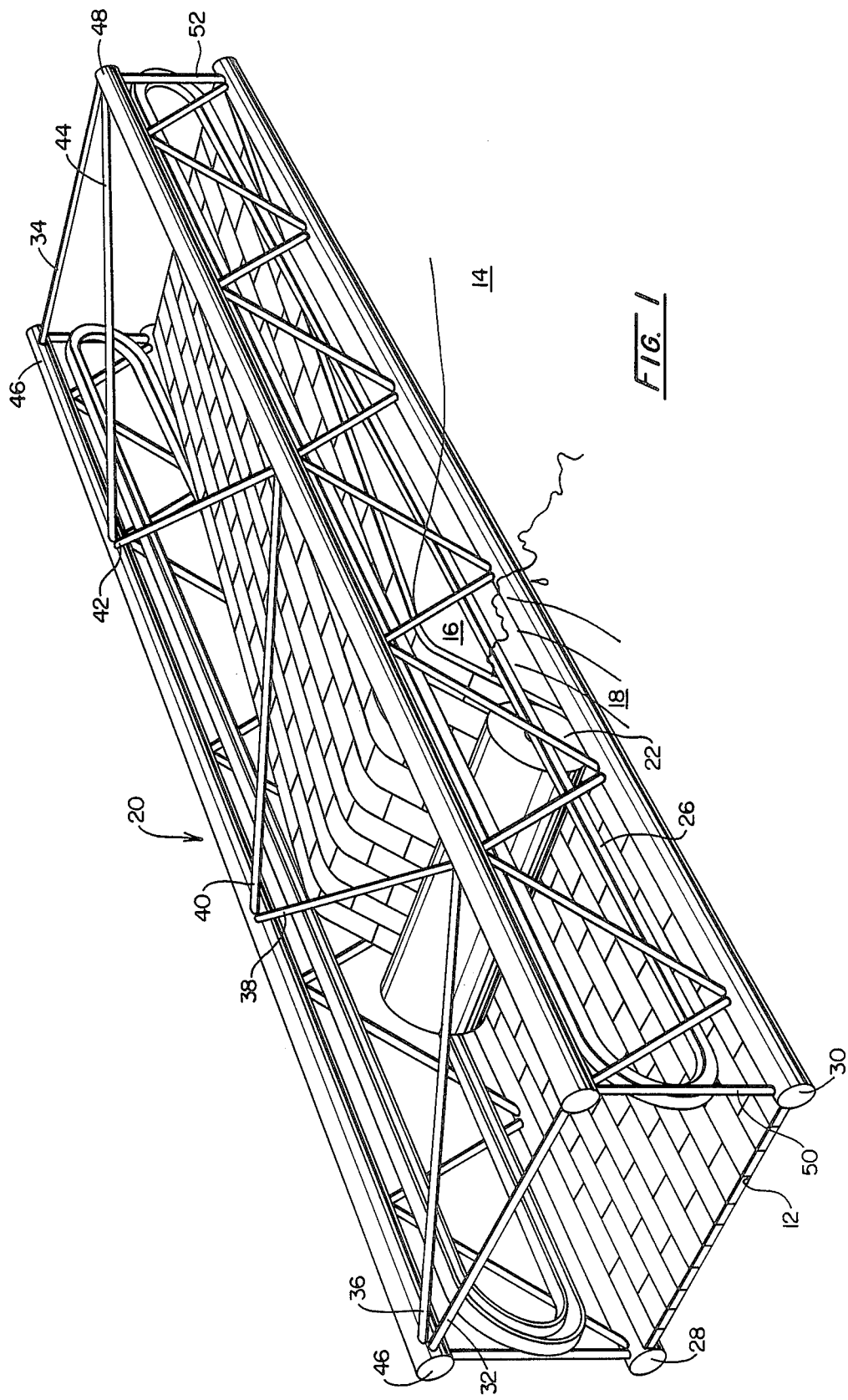
FIG. 1 is a perspective view of an apparatus according to the present invention.

FIG. 1 is a perspective view of an apparatus according to the present invention. A flexible floating belt 12, described in greater detail below, floats upon the surface of the water 14 conforming to the wave crests 16 and wave troughs 18 on that water. The flexible floating belt 12 is generally retained within floating rigid structure 20, also described in greater detail below. An energy roller 22 is disposed upon the belt 12, and is rolled along the length of belt 12 by the action of the advancing wave crest 16 as it moves below the belt 12. The belt 12 ripples along its length in response to the movement of the wave, at all times conforming to the shape of the water surface upon which it floats. It will be appreciated that optimal action from any wave will be achieved only if the length of the belt is disposed in the direction of wave movement.

It is preferred that an axel 24, shown more clearly in FIG. 3, be placed at the center of rotation of the energy roller 22 and that axel 24 be retained in a guide track assembly 26. Guide track assembly 26 restrains only the vertical movement of energy roller 22, roller 22 being free to move in the horizontal plane. Guide track assembly 26 additionally aids in retaining energy roller 22 in proper position to roll directly along the length of flexible floating belt 12.

Turning now to FIGS. 2 and 3 which when viewed together with FIG. 1 give a better overall understanding of an apparatus according to the present invention, the detailed description continues. FIG. 3 is an end elevation view of the apparatus of FIG. 1, while FIG. 2 is a side elevation sectional view of the same apparatus taken along line 2—2 of FIG. 3. For clarity and consistency, common numbering of elements will be utilized on FIGS. 1, 2 and 3. For simplicity, only one wave crest 16 is shown. It will be appreciated that wave crests would likely appear more often, the side elevational contour of flexible floating belt 12 exhibiting a more undulating shape than that shown. However, since the present invention involves the action of only a single wave at a time upon the energy conversion device, only one is herein shown.

Wave crest 16 raises flexible floating belt 12 above the line of guide track assembly 26 immediately behind energy roller 22. The direction of motion of wave crest 16 in FIG. 2 is from right to left. Thus, energy roller 22 is "pushed" from right to left in FIG. 2 by the wave crest raised portion of flexible floating belt 12. It will be understood that as energy roller 22 is moved, it gains momentum, both linear and angular, since the roller has both mass and a centroid. The momentum may be reduced by extraction of energy by methods and apparatus not shown but well understood in the art, including but not limited to electrical generation devices included inside the energy roller or attached to the guide track assembly.

The floating rigid structure according to the present invention is more clearly understood by reference to FIGS. 1 and 2. The structure is preferably constructed from aluminum alloy materials. The mass of the entire structure plus all other appurtenant items must be less than the water volume displacement mass thereby permitting the entire structure to float. The preferred floatation depth is such that flexible floating belt 12 is maintained at an average height near the level of lower guide track assembly 26. The methods of such structure design are well known in the art, including the addition of ballast mass below the structure to maintain the resulting rigid structure steady and upright in the waves.

The preferred structural design of the floating rigid structure 20 according to the present invention includes tubular closed end members 28 and 30 providing the primary floatation and establishing the overall length of the structure. Tube members 28 and 30 are maintained parallel and spaced apart by structural members, not shown, similar to structural members 32, 34, 36, 38, 40, 42 and 44 which maintain the spacing of longitudinal support members 46 and 48. The vertical spacing between members 30 and 48, and 28 and 46 is similarly accomplished by use of a structural truss comprising members 50, 52, 50' and 52' and others as shown and as is well known in the art. It will be appreciated that the known stresses and constraints imposed by the sea and by corrosion are applied to the design by known methods to complete the structure. As is further described below, the flexible floating belt is not a part of the floating rigid structure, the belt being simply retained by said structure to render the belt more useful.

Turning now to FIG. 6, an alternative embodiment of a flexible floating belt, energy conversion apparatus according to the present invention is better understood. A flexible floating belt 60, as is more fully described below, is disposed upon the waves of the water, conforming thereto. Upon the upper surface of flexible floating belt 60 are located flexible track assemblies 62 and 64 which conform to the surface of belt 60. An energy sled 66 rides the track assemblies in a manner similar to that of the energy roller previously described. Energy sled 66 does not roll, so that it developes only linear momentum. A wave crest 68 raises flexible floating belt 60 behind energy sled 66. The direction of motion of wave crest 68 is generally right to left in FIG. 6. Thus, energy sled 60 is "pushed" along track assemblies 62 and 64 in wheel assemblies mounted on the sled.

At the ends of flexible floating belt 60, rigid track assemblies 70 and 72 are provided as continuations of flexible track assemblies 62 and 64. Preferably, rigid track assemblies 70 and 72 are formed into a return track as shown in FIG. 6, the return track being supported above the water surface by floating support structure 74, which is of a structural design well known in the art. In this way, the momentum imparted to the energy sled may be converted to another form of energy, as for example, electricity by means generators located within the energy sled itself. Alternatively, the energy sled can be the car portions of a surf amusement ride that is almost totally powered by waves. As an amusement ride, the momentum is expended raising the energy sled to a high point of potential energy. There, in a rest position, people may enter the ride. Thereafter, the potential energy is spent transporting the energy sled and its passengers to a lower elevation at the surface of the flexible floating belt. The sled is then "pushed" to shore by the action of a wave as previously described.

FLEXIBLE FLOATING BELT

The flexible floating belt assembly is more fully understood by reference to FIGS. 7, 8 and 9. In FIG. 7, flexible track assembly 80 is shown located on the upper surface of a flexible floating belt 82, according to the present invention. The overall specific gravity of the flexible floating belt assembly, including in the composite a track assembly, if any, must be less than 1.0. It is prefered that the specific gravity of a representative section of flexible floating belt including in composite the specific gravity of the energy roller or energy sled be less than 1.0 in order that the belt fully float even with the energy roller or sled upon it. This is simply accomplished in theory by controlling the construction of the energy roller or sled, but in application still requires a greater floatational margin of the flexible floating belt assembly itself.

A flexible floating belt 82, according to the present invention is preferably made of a continuous planar sheet 84 of a closed cell flexible foam elastomeric material coextensive with the length and width of the entire flexible floating belt assembly. In practice, several sheets may be edge spliced by techniques known in the art to construct the complete planar sheet 84. The thickness and choice of material are consistent with the environment of use, and are selected in accordance with well known materials engineering criteria. It is preferred that the planar sheet be reinforced by means of rods, not shown, of rigid, tough materal as for example fiber glass reinforced plastic or of a metal to provide strength across the width only of the planar sheet. It will be appreciated that such rods may not be used longitudinally unless flexibility is introduced into the rods. A woven screen, not shown, of fiberglass reinforced plastic rods having flexibility may also be utilized on either surface of the planar sheet or integral thereto as a multi-directional reinforcement.

Additionally, a flexible floating belt assembly 82 according to the present invention preferrably is provided with rigid closed cell foam polymeric blocks 86 along the bottom surface of planar belt 84. The rigid block may also be reinforced as previously described by rigid rods, or by other reinforcement methods which are well known in the art. Since the center of flexure of the flexible floating belt assembly is within the planar sheet, the rigid floatable closed cell foam blocks 86 must be spaced apart longitudinally by space 88 as shown in FIG. 7. In this way, the blocks do not intersect or interfer with one another as the belt flexes longitudinally to conform to the surface of the water.

The flexible floating belt assembly as described above is the belt disclosed in the descriptions of FIGS. 1,2,3 and 6 supra. It will be appreciated that the use of such a flexible floating belt assembly has the effect of moderating near shore waves, thus reducing the effect of those waves on the shore. In this way, erosion protection can be achieved concurrent with the potential for wave energy extraction and conversion to useful form.

FIG. 8 describes the flexible track assembly 80 of FIG. 7, as well as provide a width-wise view of the preferred flexible floating belt construction. The track 80 is shown as a standard "I" rail and is preferably made of a flexible plastic material capable of freely flexing and following the contours of the flexible floating belt as it conforms to wave shapes upon the surface of the water. Also shown is flexible floating belt assembly 82 made of the planar sheet 84, as previously described and the rigid floating blocks 86 which are shown as continuous across the width of the belt. The track 80 must have the strength to support the sled or roller, and is utilized to reduce the friction of the energy roller or sled as it traverses the length of flexible floating belt 82. FIG. 9 shows an alternative track 90 located for convenience on the same flexible floating belt 82. A circular cross-sectioned flexible track is disclosed, preferably an extruded plastic material. The shape reduces friction even further and provides strength as well as flexibility.

ALTERNATIVE SURF ENERGY EXTRACTION APPARATUS

Figure 4:
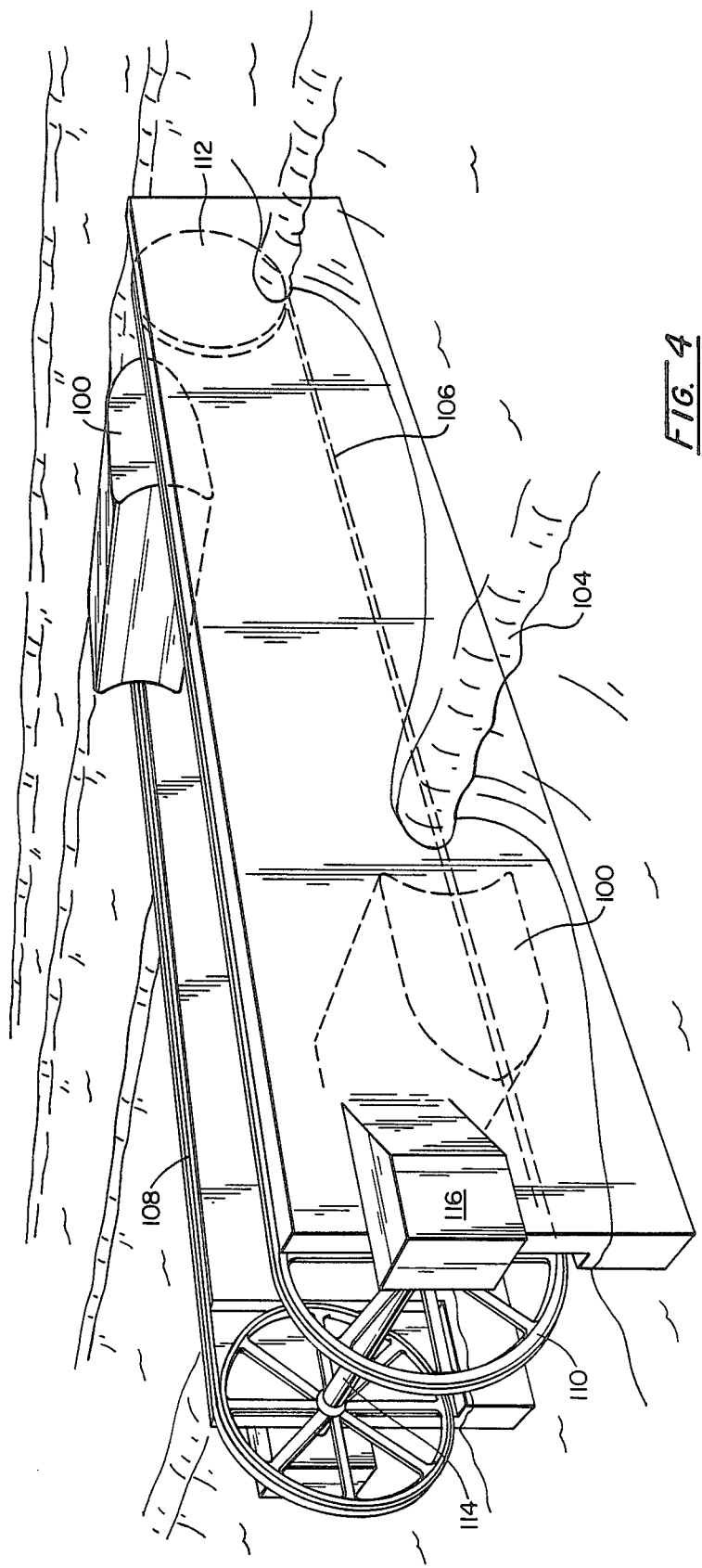
FIG. 4 is a perspective view of an alternative embodiment of an apparatus according to the present invention.
Figure 5:
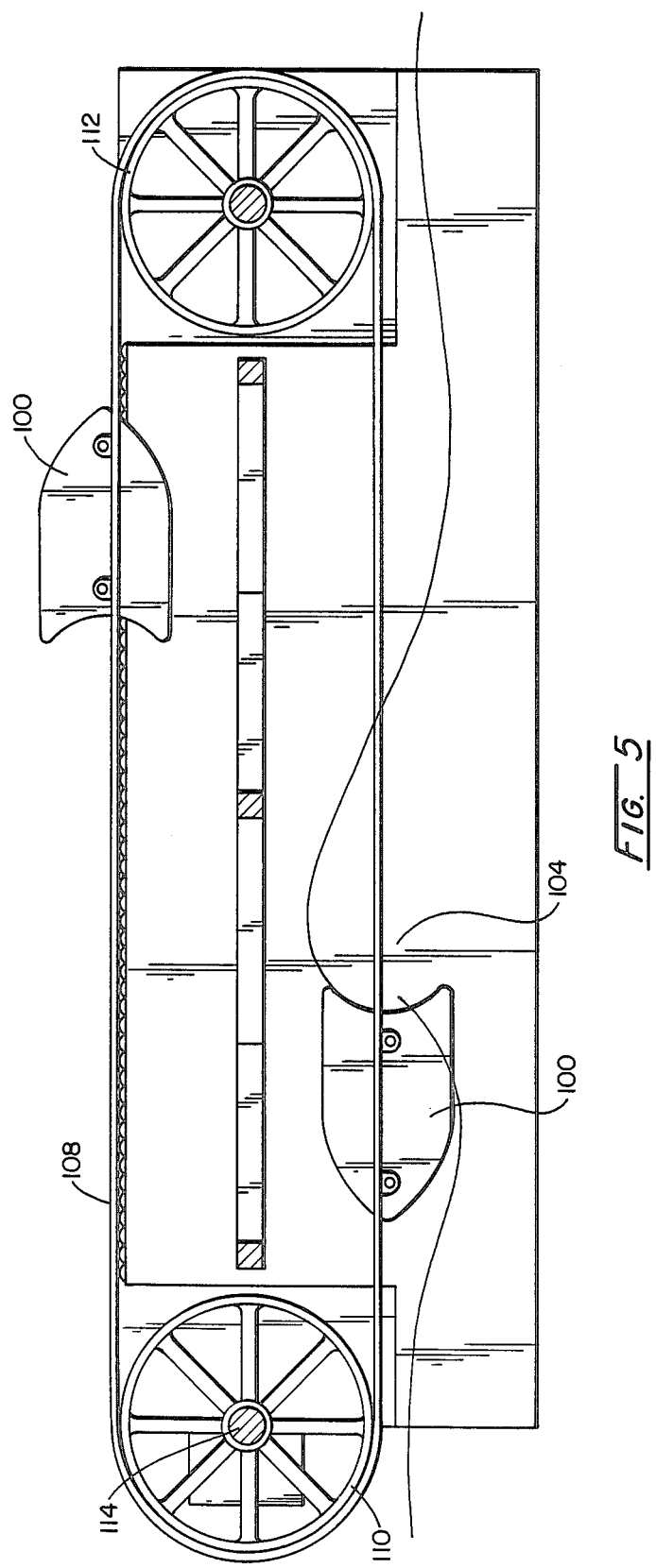
FIG. 5 is side elevation sectional view of the apparatus of FIG. 4.

Turning now to FIGS. 4 and 5, an alternative surf energy extraction apparatus according to the present invention is disclosed. FIG. 4 is a perspective view of an apparatus which utilizes hydrodynamically shaped float 100. Float 100 is retained within floating rigid structure 102. The assembly and requirements of floating rigid structure 102 are similar to those of floating rigid structure 20 of FIG. 2 above. An alternative construction wherein the sides are separate spaced apart floats is disclosed here in FIG. 4. Hydrodynamically shaped float 100 is pushed along the length of floating rigid structure 102 by wave crest 104. As the float 100 progresses along the length of the rigid floating structure 102, it moves linear drive chain assemblies 106 and 108 which are continuous chain drives around energy wheels 110 and idler wheels 112. The energy wheels 110 are connected to shaft 114 which drives a generator 116 to generate electrical energy.

The shape of float 100 is such that it may be pushed through the water with low energy loss, while the rear of the float is shaped to maximize the effectiveness of the wave crest. To achieve maximum energy extraction, float 100 must float well down in the water to prevent the wave from passing under the float yet protrude above the ambient surface a sufficient distance to prevent the wave from breaking over the top of the float. It can be appreciated that a fully effective float has a large vertical profile. The floating rigid structure maintains the proper positioning of float 100 relative to the water surface by vertically restraining movement of the float by means of the linear drive assembly while allowing free horizontal movement. Additionally, it will be appreciated that more than one float is necessary to provide continuous movement of the linear drives 106 and 108. Since the velocity of the wave crests varies as the waves approach shore, it will be further appreciated that the linear drives while in constant motion will move at a time varying speed. This variation may require smoothing out by means of a fly wheel at the energy wheels 110. Additionally, the generator could be mounted within the floats 100 making the generation of electricity independent of velocity.

It will further be understood that the above described linear drives may be chain or belt driven according to methods well known in the art.

It will be apparent from the above description that this invention provides for the extraction of energy from waves, including near-shore waves and surf, by the waves imparting momentum to an energy roller. The energy roller moves along a flexible floating belt assembly which conforms to the water surface upon which it floats. The energy roller is situated at or near the trough of a wave as it passes beneath the flexible floating belt, the trough moving along the length of the belt. Further, an energy car may be substituted for the energy roller, the energy car preferably riding flexible tracks located on the surface of the flexible floating belt. As either the energy roller or the energy car is moved, it gains momentum. The momentum in the energy car is linear while the energy roller gains linear and angular momentum. The momentum is then converted to another energy form, as for example electricity, and may also be used, in part, to return the energy roller or energy car to the seaward end of the flexible floating belt.

The present invention also provides for a hydrodynamically shaped energy float to be substituted for the energy car or roller and the flexible floating belt. The float is moved ahead of a wave crest, substantially in the trough of the wave, thereby gaining linear momentum.

This invention may be embodied in other specific forms without departing from the spirit or essential characteristics thereof. Present embodiments are therefore considered in all respects as illustrative and not restrictive, the scope of the invention being indicated by the appended claims rather than the foregoing description and drawings, and all changes that come within the meaning, range and equivalency of the claims are therefore intended to be embraced therein.

Having thus described this invention, what is claimed is:

1. A method for extracting energy from waves, wherein said waves have a height, crests, trough and a direction, comprising the steps of:
   disposing upon the surface of the water a flexible floating belt having a width and a length;
   orienting the length of said belt substantially parallel to the direction of said waves, said belt substantially conforming to the crests and troughs of said waves;
   disposing upon said flexible floating belt an energy roller having a length and a diameter, the length of said roller being disposed parallel to the width of said belt;
   locating said roller on said belt where said belt conforms to a wave trough, said belt imparting momentum to said roller in response to wave action.

2. The method according to claim 1 wherein said waves are near-shore surf, further comprising the step of orienting said belt to be substantially perpendicular to the shore-line.

3. The method according to claim 1 further comprising the steps of providing a rigid floating structure in which said flexible floating belt is retained, said structure having a guide track; engaging the center of rotation of said energy roller in said guide track.

4. The method according to claim 3 further comprising the steps of providing at said track means for conversion of the linear momentum of said roller into electrical energy.

5. The method according to claim 3 further comprising the steps of providing a return track as a continuation of said guide track.

6. An apparatus for extracting energy from waves, of the type disposed on the surface of the water, comprising:
   a flexible floating belt having a width and a length;
   an energy roller having a length and a diameter located upon said flexible floating belt, the length of said roller being parallel to the width of said belt;
   a rigid floating structure in which said floating belt is retained, said structure having a guide track for engaging the center of rotation of said energy roller allowing said roller to move linearly in a direction parallel to the water and along the length of said belt.

7. An apparatus according to claim 6 wherein said flexible floating belt is further comprised of:
   a closed cell flexible foam elastomeric planar sheet having the length and width of said belt, and having a specific gravity less than 1.0;
   a plurality of closed cell rigid foam polymeric blocks attached to the bottom surface of said elastomeric sheet at a regular spacing sufficient that adjacent blocks will not touch each other when said planar sheet is flexed, said polymeric blocks having a specific gravity less than 1.0.

8. An apparatus according to claim 7 further comprising reinforcing materials disposed within said elastomeric sheet to add strength but not to impair flexibility along the length of said belt.

9. An apparatus according to claim 6 further comprising a means for conversion of the linear motion of said roller into electrical energy.

10. A method for extracting energy from waves wherein said waves have a wave height, crests, and troughs and a direction, comprising the steps of:
    disposing upon the surface of the water a rigid floating structure having a length, a height and a width;
    orienting said structure substantially parallel to the direction of said waves,
    providing at least one hydrodynamically shaped energy float disposed within said rigid floating structure across the width of said structure;
    attaching a linear drive means to said hydrodynamically shaped float, said linear drive means having a continuous belt-like member which is disposed in a plane perpendicular to the water surface along the length of said rigid structure from one end, said belt-like member of said structure to the other end passing around the circumferences of an energy drive wheel mounted at one end of said structure and an idler wheel mounted at the other end of said structure
    engaging said belt-like member and said energy wheel such that linear movement of said belt-like member drives said energy wheel, said belt-like member having been driven along the water surface by the action of said wave crests.

11. A method for extracting energy from waves, wherein said waves have a height, crests, troughs and a direction, comprising the steps of:
    disposing upon the surface of the water a flexible floating belt having a width and a length;

orienting the length of said belt substantially parallel to the direction of said waves; said belt substantially corresponding to the crests and troughs of said waves;

providing at least one flexible rail on the upper surface of and parallel to said flexible floating belt;

disposing upon said rail an energy car having mass and a lubricated means corresponding to said rail;

locating said car where said belt conforms to a wave trough, said belt imparting momentum to said car in response to wave action.

* * * * *